United States Patent
Yoon et al.

(10) Patent No.: US 9,738,315 B2
(45) Date of Patent: Aug. 22, 2017

(54) PARKING GUIDANCE APPARATUS AND METHOD FOR VEHICLE

(71) Applicant: HYUNDAI MOTOR COMPANY, Seoul (KR)

(72) Inventors: Dae Joong Yoon, Hwaseong-si (KR); Jin Wook Choi, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/181,863

(22) Filed: Jun. 14, 2016

(65) Prior Publication Data
US 2017/0096167 A1 Apr. 6, 2017

(30) Foreign Application Priority Data
Oct. 5, 2015 (KR) .................. 10-2015-0139870

(51) Int. Cl.
*B62D 15/02* (2006.01)
*B60R 1/00* (2006.01)
*G08G 1/14* (2006.01)

(52) U.S. Cl.
CPC ............ *B62D 15/028* (2013.01); *B60R 1/00* (2013.01); *B62D 15/0285* (2013.01); *G08G 1/14* (2013.01); *B60R 2300/102* (2013.01); *B60R 2300/607* (2013.01); *B60R 2300/806* (2013.01)

(58) Field of Classification Search
CPC ... B62D 15/028; B60R 1/00; B60R 2300/607; B60R 2300/102; B60R 2300/806
See application file for complete search history.

(56) References Cited

U.S. PATENT DOCUMENTS

| | | |
|---|---|---|
| 2001/0017591 A1 | 8/2001 | Kuriya et al. |
| 2002/0175832 A1 | 11/2002 | Mizusawa et al. |
| 2004/0260439 A1 | 12/2004 | Endo et al. |
| 2007/0010918 A1 | 1/2007 | Shimazaki et al. |
| 2007/0112490 A1 | 5/2007 | Mizusawa |
| 2008/0174452 A1* | 7/2008 | Yamamoto ........... B62D 15/028 340/932.2 |
| 2010/0066515 A1* | 3/2010 | Shimazaki ............ B60W 50/14 340/435 |
| 2010/0089677 A1 | 4/2010 | Tanaka et al. |

(Continued)

FOREIGN PATENT DOCUMENTS

| | | |
|---|---|---|
| EP | 1743808 | 1/2007 |
| EP | 2135779 A | 12/2009 |

(Continued)

*Primary Examiner* — Rodney Butler
(74) *Attorney, Agent, or Firm* — Brinks Gilson & Lione

(57) ABSTRACT

A parking guidance apparatus includes: an image obtainer to capture an image around a vehicle; an image processor to generate an around view monitoring (AVM) image by using images obtained through the image obtainer; and a controller. When entering a parking guidance mode, the controller displays a parking position marker near a vehicle within the AVM image, determines a target parking slot using the parking position marker, displays a point marker for setting an initial movement position from which the vehicle may enter the target parking slot, guides movement of the vehicle to the initial movement position using the point marker, and guides the vehicle to enter the target parking slot when the vehicle reaches the initial movement position.

17 Claims, 17 Drawing Sheets

(56) References Cited

U.S. PATENT DOCUMENTS

| | | | |
|---|---|---|---|
| 2010/0106372 A1 | 4/2010 | Watanabe et al. | |
| 2010/0228426 A1 | 9/2010 | Suzuki et al. | |
| 2011/0095910 A1* | 4/2011 | Takano | B60R 1/00 340/932.2 |
| 2012/0314056 A1* | 12/2012 | Michiguchi | B60W 30/18036 348/118 |
| 2013/0162829 A1* | 6/2013 | Kadowaki | B62D 15/028 348/148 |
| 2013/0229524 A1* | 9/2013 | Vovkushevsky | B60R 1/00 348/148 |
| 2015/0197197 A1* | 7/2015 | Watanabe | B60R 1/00 348/118 |
| 2015/0254981 A1 | 9/2015 | Tachibana et al. | |
| 2016/0090044 A1* | 3/2016 | Watanabe | B60R 1/12 348/148 |
| 2016/0203377 A1* | 7/2016 | Irie | G08G 1/168 348/118 |
| 2016/0288833 A1* | 10/2016 | Heimberger | B62D 15/027 |
| 2016/0332572 A1* | 11/2016 | Gibeau | B60R 1/00 |

FOREIGN PATENT DOCUMENTS

| | | |
|---|---|---|
| EP | 2902271 A | 8/2015 |
| JP | 2001-10431 | 1/2001 |
| JP | 2001-55099 | 2/2001 |
| JP | 2001-71842 | 3/2001 |
| JP | 2001-315604 A | 11/2001 |
| JP | 2007-269262 | 10/2007 |
| JP | 2008-114628 | 5/2008 |
| JP | 2011-16406 | 1/2011 |
| JP | 2011-189841 A | 9/2011 |
| JP | 2012-066709 | 4/2012 |
| KR | 10-2009-0064585 A | 6/2009 |
| KR | 10-2010-0075750 A | 7/2010 |
| WO | 2009-044513 A | 4/2009 |

* cited by examiner

PARKING GUIDANCE APPARATUS AND METHOD FOR VEHICLE

CROSS-REFERENCE TO RELATED APPLICATION

This application claims the benefit of and priority to Korean Patent Application No. 10-2015-0139870, filed on Oct. 5, 2015, which is incorporated herein by reference in its entirety.

TECHNICAL FIELD

The present disclosure relates to a parking guidance apparatus and method for providing parking guidance for a vehicle.

BACKGROUND

The statements in this section merely provide background information related to the present disclosure and may not constitute prior art.

Recently, a parking guidance apparatus such as a smart parking assist system (SPAS) is installed in vehicles for driver convenience. Such a parking guidance apparatus supports driver's parking of a vehicle by determining a target parking position, generating a parking route to the target parking position, and providing the generated parking route.

A related art parking guidance apparatus is limited to parking guidance regarding perpendicular parking or longitudinal parking and cannot provide parking guidance regarding various types of parking.

Also, since the related art parking guidance apparatus provides a straight line-based guidance line, when a driver wants to park a vehicle according to parking guidance, he or she should drive the vehicle to enter as parallel as possible so as to be spaced apart from a parking slot by a predetermined distance to make a guidance line match a parking slot line in which the vehicle is intended to be parked. Here, when the guidance line does not match the parking slot line, it is impossible to park the vehicle normally.

In other words, after the driver operates the vehicle to enter as parallel as possible to the parking slot line, the driver should move the vehicle from an initial stop position to a fixed start position and a predetermined movement position to park the vehicle. This frequently causes the driver to repeatedly operate the vehicle several times in order to make the guidance line and the parking slot line match in many cases.

In addition, a distance between the vehicle and the parking slot is limited to about 1 meter, and only a route designated by the parking guidance apparatus may be guided.

Moreover, if a vehicle does not have an auto-steering function, a guidance marker should match a parking position entry line, and the like, and even though the auto-steering function is provided in the vehicle, the guidance marker should be adjusted to the parking position entry line in a target parking range through a separate operation, causing inconvenience.

Related parking guidance is disclosed in Document JP Publication No. JP2008114628A.

SUMMARY

The present disclosure provides a parking guidance apparatus and method for a vehicle, providing parking guidance for various types of parking using an area-based parking guidance marker in guiding around view monitoring (AVM) image-based parking.

Another aspect of the present disclosure provides a parking guidance apparatus and method for a vehicle, providing a driver with high operation convenience and degree of freedom in operation when parking by using a parking position marker and a point-based adjusted marker.

In one form, a parking guidance apparatus includes: an image obtainer configured to capture an image around a vehicle; an image processor configured to generate an around view monitoring (AVM) image by using images obtained through the image obtainer; and a controller configured to, when entering a parking guidance mode, display a parking position marker near a vehicle within the AVM image, determine a target parking slot using the parking position marker, display a point marker for setting an initial movement position from which the vehicle may enter the target parking slot, guide movement of the vehicle to the initial movement position using the point marker, and guide the vehicle to enter the target parking slot when the vehicle reaches the initial movement position.

According to another form, a parking guidance method includes: displaying a parking position marker near a vehicle within an around view monitoring (AVM) image when a parking guidance mode is entered; determining a parking-available area within the AVM image as a target parking slot using the parking position marker; displaying a point marker for setting an initial movement position from which a vehicle may enter the target parking slot, after the target parking slot is determined; guiding movement of the vehicle to the initial movement position by using the point marker; and when the vehicle reaches the initial movement position, guiding entry of the vehicle to the target parking slot.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
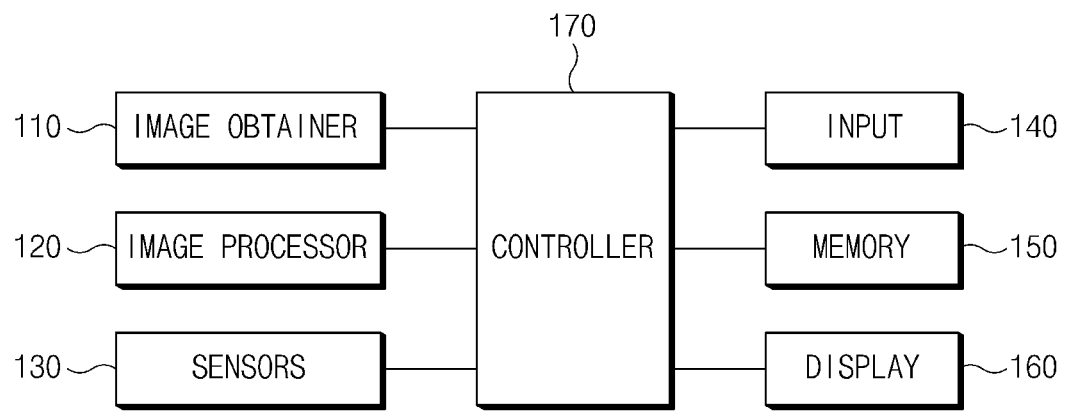
FIG. 1 is a block diagram of a parking guidance apparatus for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing exemplary forms of the present disclosure, if it is determined that a detailed description of known techniques associated with the present disclosure unnecessarily obscures the gist of the present disclosure, the detailed description thereof will be omitted.

The present disclosure provides parking guidance enabling a driver to easily park by setting a parking position based on an area concept, regardless of a heading angle of a vehicle when entering a parking slot, intuitionally steering on the basis of full turn, and setting a movement position in a point form.

Figure 2A:
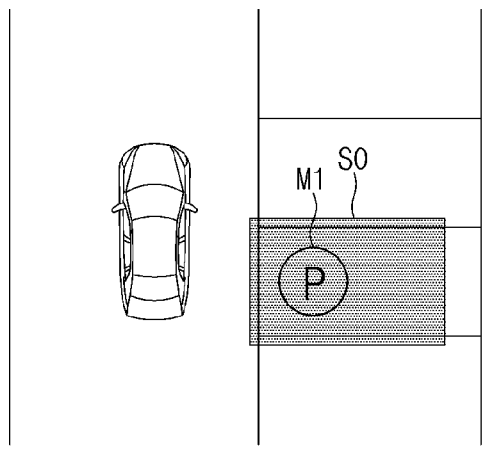
FIGS. 2A through 2C are views illustrating parking guidance markers related.
Figure 2B:
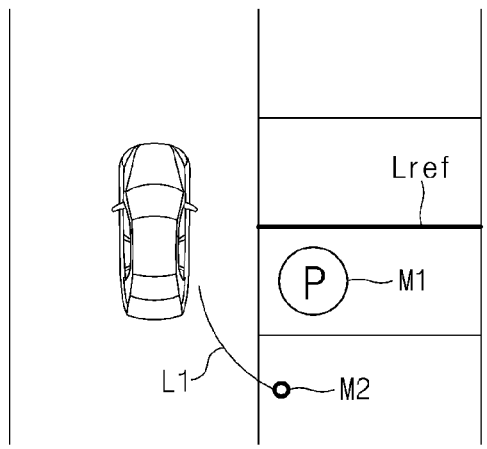
Figure 2C:
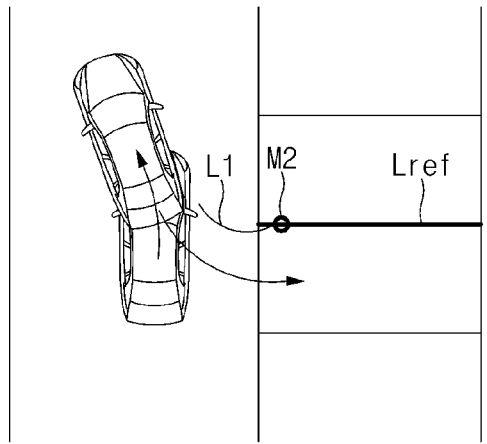

FIG. 1 is a block diagram of a parking guidance apparatus for a vehicle, and FIGS. 2A through 2C are views illustrating parking guidance markers related to the present disclosure.

The parking guidance apparatus provides parking guidance based on around view monitoring (AVM) providing omni-directional images around a vehicle. As illustrated in FIG. 1, such a parking guidance apparatus includes an image obtainer 110, an image processor 120, sensors 130, an input 140, a memory 150, a display 160, and a controller 170.

The image obtainer 110 is installed in a vehicle and captures an image around a vehicle. The image obtainer 110 obtains an image in omni-directions (360°) in relation to a vehicle. The image obtainer 110 may be configured as a plurality of wide angle cameras, a single omni-view camera, an AVM camera, or the like.

The image processor 120 generates a top view image (AVM image) using images captured through the image obtainer 110 under the control of the controller 170. The image processor 120 performs image processing such as correcting a distorted image, processing, and the like.

The sensors 130 sense vehicle data using various sensors installed within the vehicle. Here, the vehicle data includes a vehicle velocity, a heading angle, a gear stage, a steering angle, and the like.

The input 140 generates input data for a user to control an operation of the parking guidance apparatus. The input 140 may be configured as a keypad, a button, a touch pad, a jog switch, a jog wheel, or the like.

The input 140 generates a parking support (parking guidance) and parking type selection signal according to a user operation. Parking types include perpendicular parking, parallel parking, 60° counter parking, 45° counter parking, cross parking, or the like.

The memory 150 stores a general program for controlling an operation of the parking guidance apparatus. Also, the memory 130 stores data generated according to an operation of the parking guidance apparatus.

The display 160 displays top view image (an AVM image) output from the image processor 120 and parking guidance information. The parking guidance information includes information such as a target parking slot, a parking position marker, a point marker, a reference parking slot line (reference line), or the like.

The display 160 includes one or more of displays such as a liquid crystal display (LCD), a light emitting diode (LED) display, a head-up display (HUD), a three-dimensional (3D) display, or a touch screen. When the display 160 is implemented as a touchscreen, the display 160 may also be used as an input device, as well as a display device.

The controller 170 controls an operation of each of the components described above to guide parking. The controller 170 enters a parking guidance mode according to a user input by the input 140. Here, the user may sequentially select a parking guidance function and a parking type through the input 140. In this exemplary form, when the user selects the parking guidance function and the parking type and when the parking guidance apparatus detects a vehicle entering a parking lot through wireless communication with a parking lot server, the parking guidance apparatus may enter a parking guidance mode and may also recognize a parking type through various sensors provided in the vehicle.

When the parking guidance mode is entered, the controller 170 obtains an AVM image around the vehicle through the image obtainer 110 and the image processor 120. The controller 170 recognizes a parking-available parking slot (i.e., a parking-available area) from the AVM image. Here, the controller 170 outputs the parking-available area in such a form that the user may recognize it.

The controller 170 displays a parking position marker around the own vehicle (i.e., the user's vehicle) within the AVM image. The controller 170 determines a display position of the parking position marker according to a central position of a rear axle at a parking start position with respect to a central axis of the parking slot. Also, the controller 170 determines a display position of the parking position marker according to a parking type, an available road width, and the presence or absence of an obstacle.

When the parking position marker is disposed within the parking-available area, the controller 170 sets the corresponding parking-available area as a target parking slot. Here, when an area equal to or greater than a predetermined area in the parking position marker overlaps the parking-available area, the controller 170 sets the corresponding parking-available area as the target parking slot.

When the vehicle stops, the controller 170 determines the parking-available area in which the parking position marker is positioned, as the target parking slot. In other words, as illustrated in FIG. 2A, the controller 170 sets a parking position marker setting-available area S0 in which the parking position marker M1 may be positioned within a parking slot. When the parking position marker M1 is disposed within the parking position marker setting-available area S0, the controller 170 sets the corresponding parking slot as the target parking slot. Here, the controller 170 tracks and displays the parking position marker M1 according to movement of the vehicle.

When the target parking slot is determined, the controller 170 sets a parking start position (initial stop position) of the vehicle by using the parking position marker M1.

The controller 170 displays a point marker M2 for setting movement to a position at which the parking slot may be entered. As illustrated in FIG. 2B, after displaying the parking position marker M1, the controller 170 displays the point marker M2 and displays a point marker connection line L1 in relation to the own vehicle for steering guidance when the vehicle enters the parking slot. Also, the controller 170 displays a point marker adjustment reference line Lref at the time of initial movement to enter the parking slot. Here, the reference line Lref is a target parking slot line.

The controller 170 moves to a position at which the vehicle may be able to enter the parking slot by using the point marker M2. As illustrated in FIG. 2C, the driver turns the steering wheel full turn to adjust the point marker M2 to the reference line Lref.

Thereafter, when the vehicle moves to the position at which the vehicle is able to enter the target parking slot, the controller 170 guides the driver to turn the steering wheel full turn in the opposite direction to park the vehicle in the target parking slot.

The controller 170 checks an operational state of the driver on the basis of vehicle data sensed through the sensors 130, and when the operational state meets a transition condition, the controller 170 automatically switches the parking guidance stage.

In the aforementioned exemplary form, the driver operates the vehicle to be parked according to the parking guidance, but the present disclosure is not limited thereto and the controller 170 may control a steering device, a braking device, and a driving device according to parking guidance to perform autonomous parking.

Figure 3A:
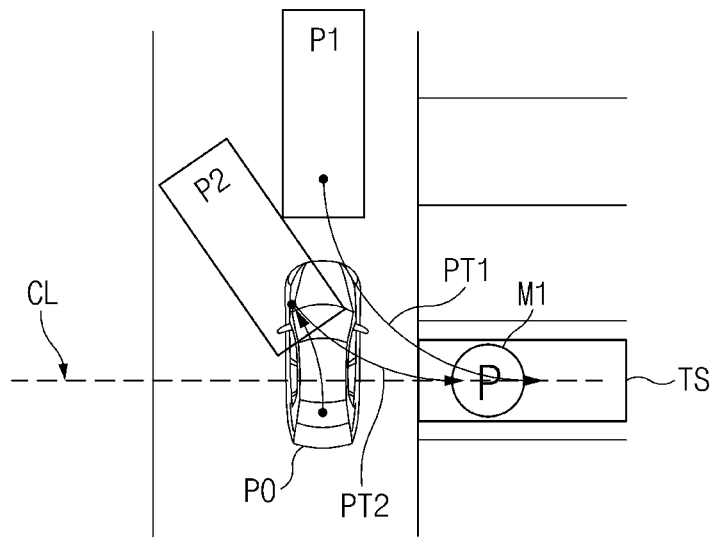
FIGS. 3A and 3B are views illustrating a relationship between a parking slot entry of a vehicle and a central trace of a rear axle in parking a vehicle.
Figure 3B:
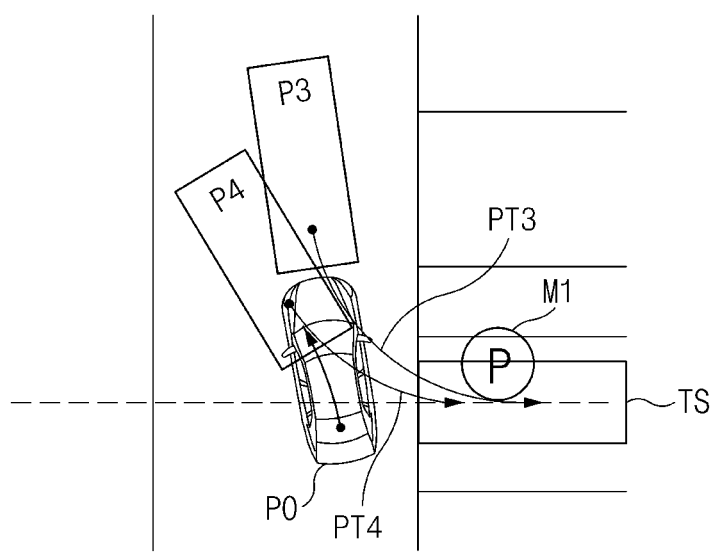

FIGS. 3A and 3B are views illustrating a relationship between a parking slot entry of a vehicle and a central trace of a rear axle in parking a vehicle. In the present exemplary form, perpendicular parking will be described as an example.

Referring to FIG. 3A, after the vehicle moves from a parking start position P0 to a parking start position (initial movement position) P1, when the driver turns the steering wheel full turn at the initial movement position P1 to turn back to park the vehicle in the parking slot TS, a central trace PT1 of the rear axle of the vehicle comes into contact with one point of a central line CL of the parking slot TS.

Meanwhile, when the driver turns the steering wheel full turn at the parking start position P0 to move forward to an initial movement position P2 and subsequently turns the steering wheel full turn in the opposite direction to move backward to park the vehicle in the parking slot TS, a central trace PT2 of the rear axle of the vehicle comes into contact with one point of the central line CL of the parking slot TS.

In this manner, when the vehicle turns back and attempts to enter the parking slot TS, the central trace of the rear axle of the vehicle meets one point of the central line CL of the parking slot TS.

A case in which perpendicular parking is attempted when the parking start position P0 of the vehicle is different from that of FIG. 3A will be described with reference to FIG. 3B.

In FIG. 3B, after the vehicle moves from the parking start position P0 to an initial movement position P3, when the driver turns the steering wheel full turn to move back, the center of the rear axle meets one point of the central line CL of the parking slot TS. That is, a central trace PT3 of the rear axle at the initial movement position P3 and the central line CL of the parking slot TS come into contact with each other.

Meanwhile, when the driver turns the steering wheel full turn at the parking start position P0 to move forward to a parking start position P4 and subsequently turns the steering wheel full turn in the opposite direction to move back, a central trace PT4 of the rear axle comes into contact with one point of the central line CL of the parking slot TS.

In this manner, even though the parking start positions of the vehicle are different, the central traces PT2 and PT4 of the rear axle may come into contact with one point of the central line CL of the parking slot TS through the same steering operation.

When the vehicle immediately enters the parking slot TS from the initial movement positions P1 and P3 at full turn steering, the vehicle may be parked at a time, but with a high possibility of collision if there is a vehicle nearby.

When the vehicle moves forward with the steering wheel turned full turn at the parking start position P0 to reach the initial movement positions P2 and P4 and the steering wheel is subsequently turned full turn in the opposite direction to enter the parking slot TS, a possibility of collision with respect to an adjacent vehicle may be low but a larger space is desired side to side than when parking is attempted from the initial movement positions P1 and P3. Thus, the parking guidance apparatus needs to set the parking start position in consideration of a width of a road.

As illustrated in FIGS. 3A and 3B, in order to enter the parking slot to park a vehicle, when the vehicle turns back, the central trace of the rear axle needs to come into contact with one point of the central line CL of the parking slot TS. The parking guidance apparatus uses a parking position marker M1 of an area concept by applying the aforementioned features thereto. Thus, a distance between the parking slot TS and the vehicle and/or an entry angle are less limited and, since only the parking position marker M1 only needs to be positioned within the target parking slot area TS, the driver may easily manipulate it.

Also, in order to reduce a change in steering while a vehicle is moved for parking, the present disclosure provides a full turn steering-based parking guidance. When the vehicle is moved at full turn steering, since the vehicle turns at a minimum turning radius, a movement distance thereof is shortened. In the present disclosure, a basically full turn-based parking guidance method is described, but the present disclosure is not limited thereto and may also be applied to any scheme other than full turn steering.

Figure 4A:
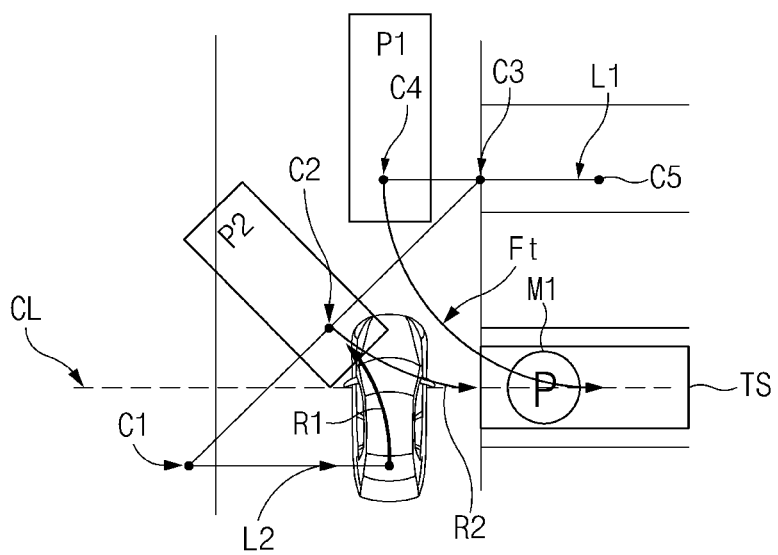
FIGS. 4A and 4B are views schematizing initial movement positions when a steering wheel turns full turn according to a display position of a parking position marker.
Figure 4B:
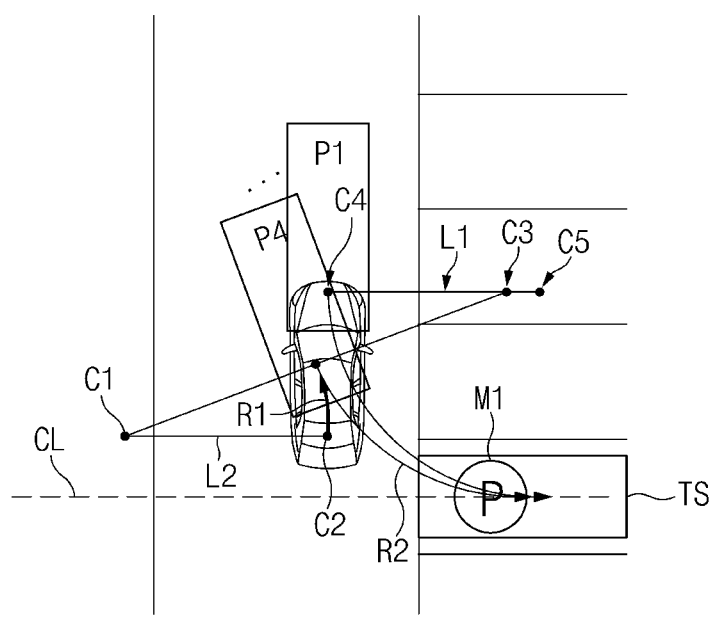

FIGS. 4A and 4B are views schematizing initial movement positions in full turn steering according to a display position of a parking position marker.

First, a case in which the parking position marker M1 is displayed in front of a side of a vehicle will be described with reference to FIG. 4A.

When a vehicle desired to be parked enters to be parallel to a parking slot TS and stopped, the center C2 of the rear axle at the initial movement position P2 is defined as a contact of a minimum turning radius circle R1 (a turning radius circle centered on C1) at an initial stop position (parking start position) and a minimum turning radius circle R2 centered on one point C3 of L1.

Here, L1 is a straight line connecting the center C4 of the rear axle when the vehicle is positioned at the initial movement position P1 from which the vehicle may be moved back at full turn steering so as to be parked in the parking slot and the center C5 of a minimum turning radius circle Ft when the vehicle is moved back at full turn steering from the initial movement position P1 so as to be parked. Only when C3 is present in L1, the minimum turning radius circle centered on C3 may be in contact with the central line CL of the parking slot TS. This means that the center C2 of the rear axle may be moved to come into contact with the central line CL of the parking slot TS. When the vehicle is positioned in P1, left and right minimum radiuses are equal in relation to the vehicle, and thus, a distance between C1 and C2 is equal to a distance between C2 and C3.

Referring to FIG. 4B, unlike the illustration of FIG. 4A, when the parking position marker M1 is displayed on a side of the rear of the vehicle, the vehicle may be initially moved from an initial stop position to an initial movement position P4 at a low rate of turning. In this manner, the parking guidance apparatus may guide parking even at a low rate of turning and lower a possibility of collision with an adjacent vehicle. That is, even when a width of a road within a parking lot is slightly narrow, a driver may easily park a vehicle.

Figure 5:
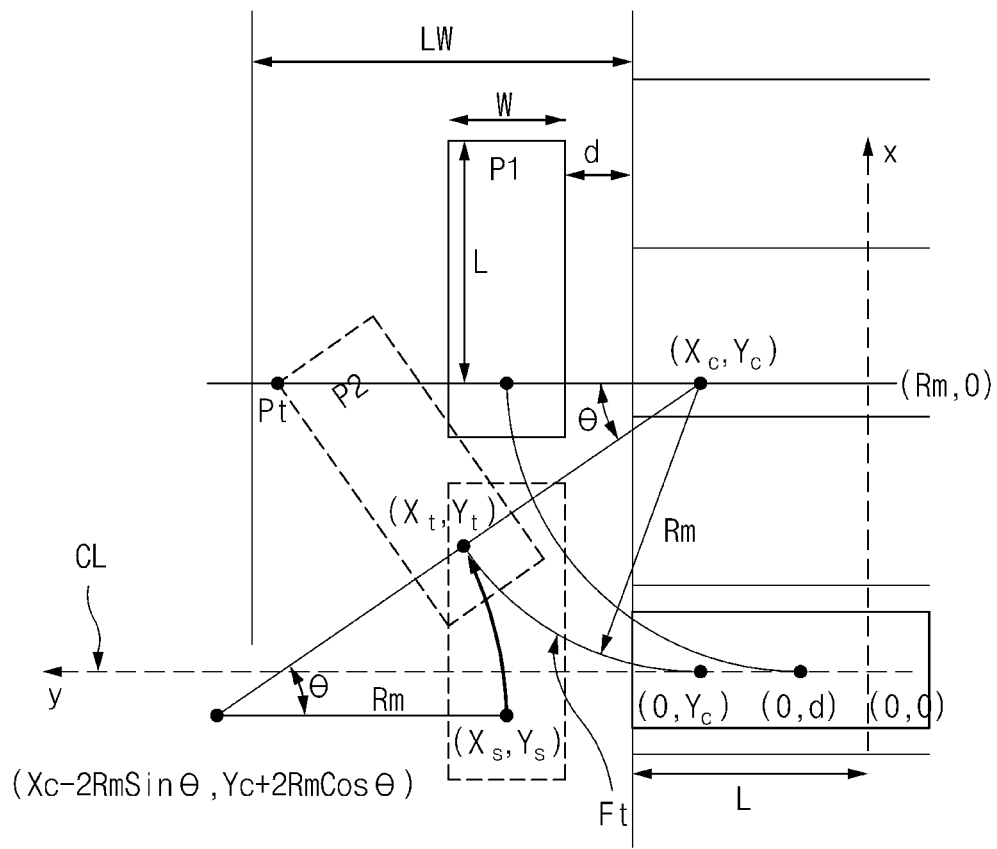
FIG. 5 is a view illustrating a central trace of a rear axle of a vehicle on the basis of a central axis of a target parking slot.

FIG. 5 is a view illustrating a central trace of a rear axle of a vehicle on the basis of a central axis of a target parking slot.

In FIG. 5, (Xs, Ys) is the center of a rear axle at an initial stop position, and (Xt, Yt) is the center of a rear axle at an initial movement position P2. (Xc, Yc) is a point at a straight line (x=Rm) connecting the center of the rear axle at the initial movement position P1 allowing the driver to park the vehicle in the target parking slot at single full turn steering and a central point of a minimum turning radius circle at the initial movement position P1.

(Xc, Yc) may be defined as expressed by Equation (1) below.

$$(Xc, Yc) = (Xt + Rm \sin \theta, Yt - Rm \cos \theta) \quad (1)$$

In Equation (1), the center (Xt, Yt) of the rear axle at the initial movement position P2 is obtained by substituting Xc=Rm to Equation (1). The center (Xt, Yt) of the rear axle at the initial movement position P2 is expressed by Equation (2) below.

$$Xt = Rm(1 - \sin \theta)$$

$$Yt = Yc + Rm \cos \theta \quad (2)$$

The center (Xs, Ys) of the rear axle at the initial stop position may be expressed by Equation (3) below.

$$Xs = Rm(1 - 2 \sin \theta)$$

$$Ys = Yc - Rm(1 - 2 \cos \theta) \quad (3)$$

A position of an end point Pt of a bumper of the vehicle may be calculated from a relationship between the center (Xs, Ys) of the rear axle at the initial stop position and the center (Xt, Yt) of the rear axle at the initial movement position P2.

$$Pt((x, y)(L \cos \theta - (Rm + W/2) \sin \theta + Rm, L \sin \theta + (W/2 + Rm) \cos \theta + Yc) \quad (4)$$

Here, Rm is a radius of a minimum turning radius circle at the position P2.

In this manner, when the parking position marker M1 is set, a turning amount and the position of the end point Pt of the bumper of the vehicle are determined according to the position of the center (Xs, Ys) of the rear axle at the initial stop position in relation to the central axis CL of the parking slot, and thus, a display position of the parking position marker M1 may be determined in consideration of a width of a road LW, or the like.

Figure 6:
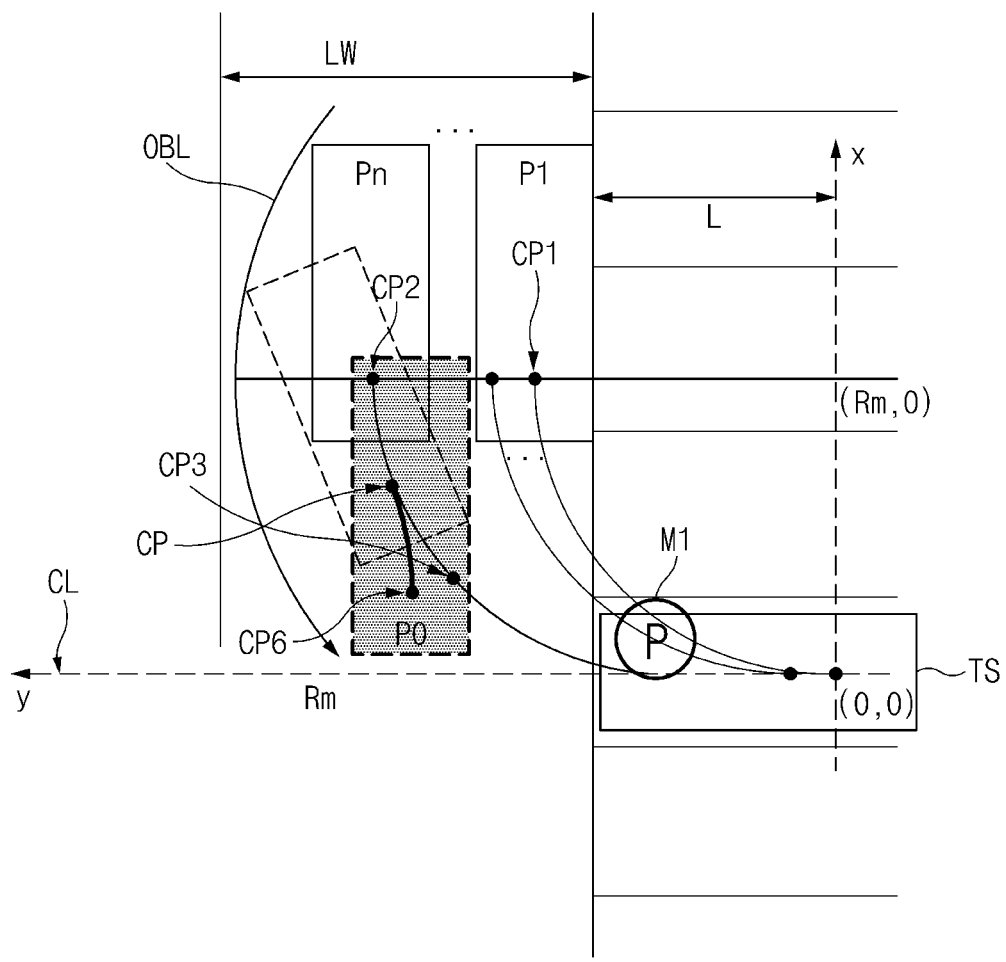
FIG. 6 is a view schematizing a parking start position in which a vehicle can be parked in a full turn-full turn manner.

FIG. 6 is a view schematizing a parking start position in which a vehicle can be parked in a full turn-full turn manner.

As illustrated in FIG. 6, when the vehicle is parked according to a full turn-full turn scheme in a state in which the parking position marker M1 is set on the rear side of the vehicle, a trace OBL of the end of an outer bumper of the vehicle which enters the parking slot should not stray out of a boundary line of road with respect to P1 and Pn, the initial movement positions, from which the vehicle may immediately enter the target parking slot at the minimum turning radius in consideration of a road width LW. In case of steering operation performed in the full turn-full turn manner, the parking guidance apparatus guides movement of the vehicle to a contact CP between the minimum turning radius circle at one of the positions P1 and Pn and the minimum turning radius circle when the vehicle turns at full turn steering from the initial stop position P0. That is, the controller 170 of the parking guidance apparatus guides movement of the vehicle until the center of the rear axle of the own vehicle reaches the contact CP.

Figure 7:
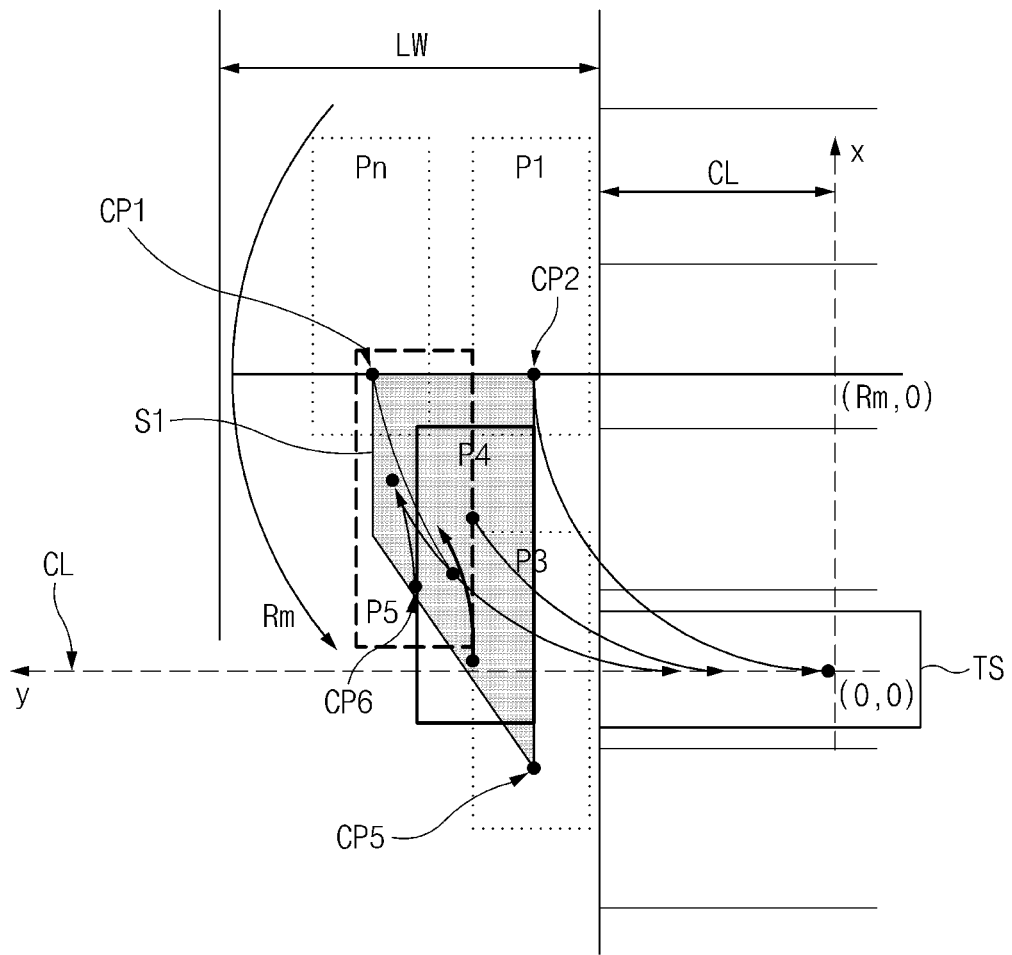
FIG. 7 is a view illustrating a parking start position area in which the center of a rear axle of an own vehicle may be positioned.

FIG. 7 is a view illustrating a parking start position area in which the center of a rear axle of an own vehicle may be positioned.

In FIG. 7, S1 is an area in which the center of the rear axle may be positioned in relation to an initial stop position (parking start position) in which the vehicle may be parked at full turn steering when the vehicle enters a parking slot. The area S1 may be varied according to an available road width LW and data (a minimum turning radius, a full length, a full width, a bumper position in relation to a wheel, and the like) of the vehicle.

FIGS. 8A through 8D are views illustrating setting a position and a size of a parking position marker.

Figure 8A:
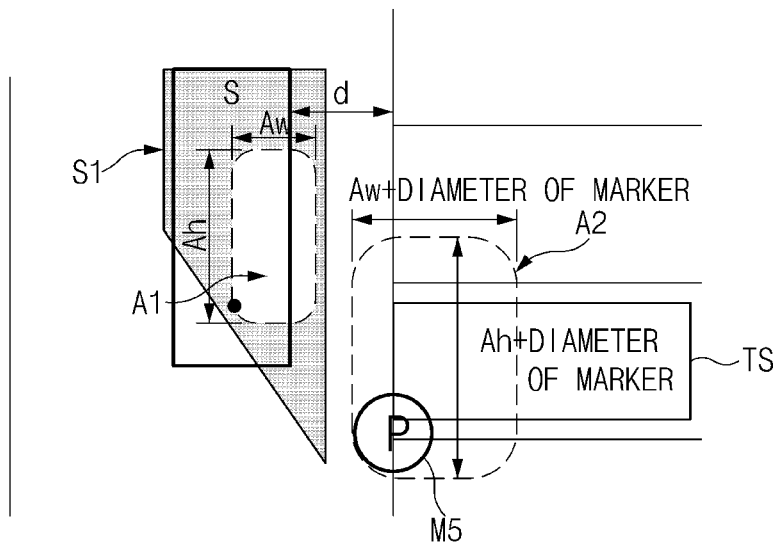
FIGS. 8A through 8D are views illustrating setting a position and a size of a parking position marker.
Figure 8B:
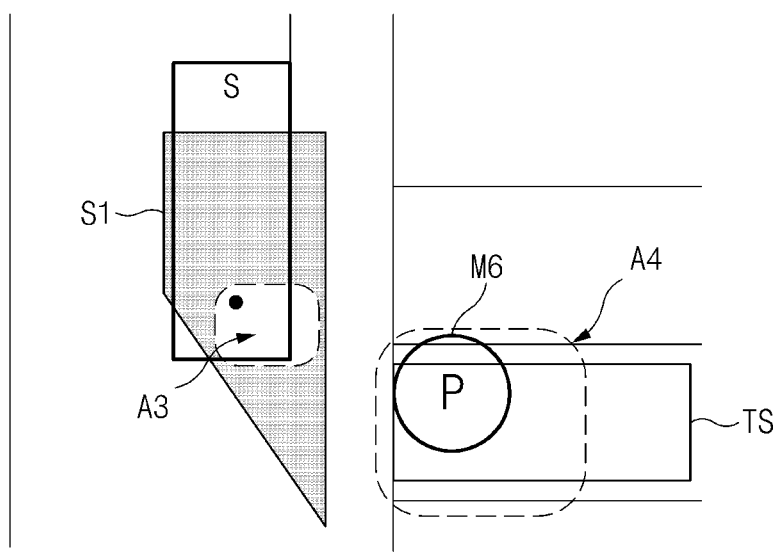

When the vehicle enters a parking guidance mode, the parking guidance apparatus displays parking position markers M5 and M6 near the vehicle in order to determine a target parking slot TS in a parking-available area within an AVM image as illustrated in FIGS. 8A and 8B.

In order to start parking guidance, a driver should move the parking position markers M5 and M6 displayed near the vehicle to be disposed at the target parking slot. Here, the parking position markers M5 and M6 are displayed to overlap at least a portion of the target parking slot.

In FIGS. 8A through 8D, A1 is a portion of a parking start position area S1, in which the own vehicle may be parked without causing contact with an adjacent vehicle in consideration of the presence of vehicles parked in parking slots positioned on the left and right of the target parking slot when the own vehicle moves to the initial movement position to enter the target parking slot. When the area A1 is set, the parking guidance apparatus may display the parking position marker M5 with respect to the center of the rear axle of the vehicle positioned within the area A1. A size and position of the area A1 may be varied according to data and a parking type of a vehicle. For example, the area A1 of a vehicle which is small and has a small minimum turning radius may be set to be larger than the area A1 of a vehicle which is large and has a large turning radius.

Figure 8C:
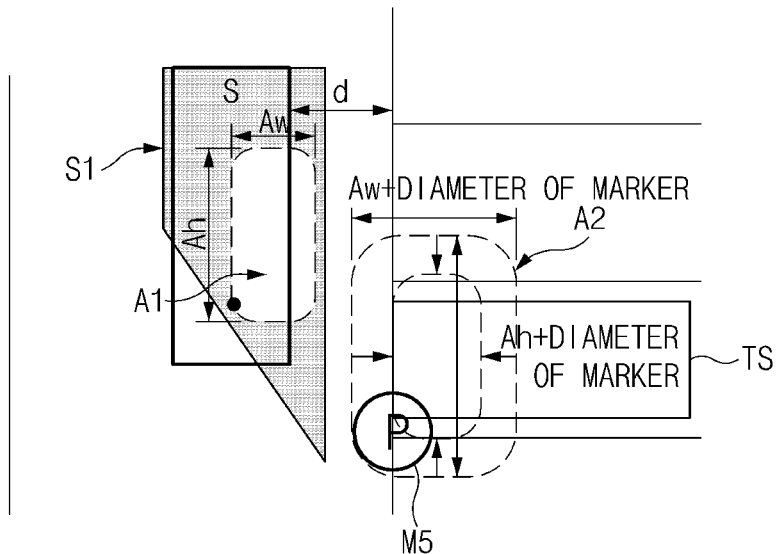

In FIG. 8C, when the center of the rear axle of the vehicle is positioned at a left boundary of the area A1, a distance "d" between the vehicle to be guided for parking and an entrance of the parking slot is increased.

The position of the parking position marker M5 may be set such that a tolerance range regarding overlap in adjusting the marker in the parking slot in relation to the boundary of A1 is a required area A2. That is, the area A2 increased by a diameter of the parking position marker in relation to A1 is a valid area in which the marker for setting a parking-available parking start position may be displayed.

Figure 8D:
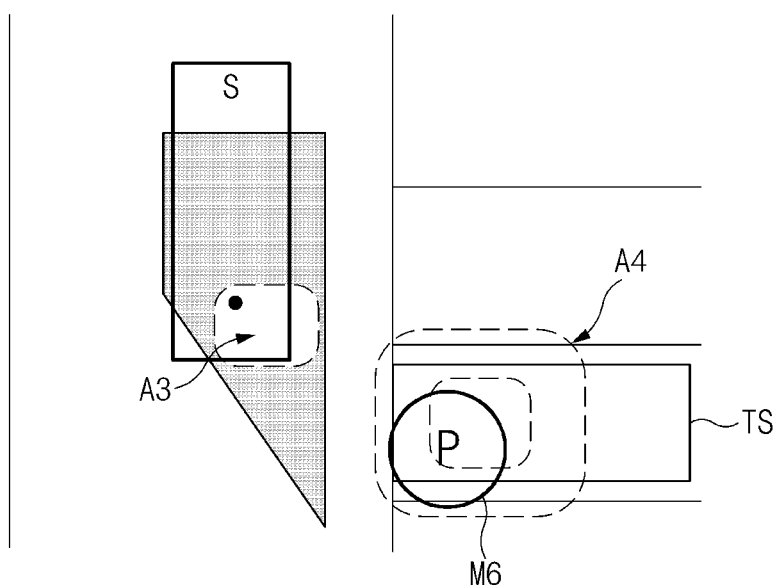

FIG. 8D illustrates an example in which a size, a position, and a valid set area of the parking position marker are modified. After the size of the set area is reduced and a position thereof is changed like A3, when the size of the marker is changed like M6, a setting range of the parking position marker and a tolerance range based on a driver operation may be set. In this exemplary form, the parking position marker has a circular shape, but the present disclosure is not limited thereto and the parking position marker may be displayed in various shapes such as a polygon, a character, an image, an icon, a design, or the like.

Figure 9:
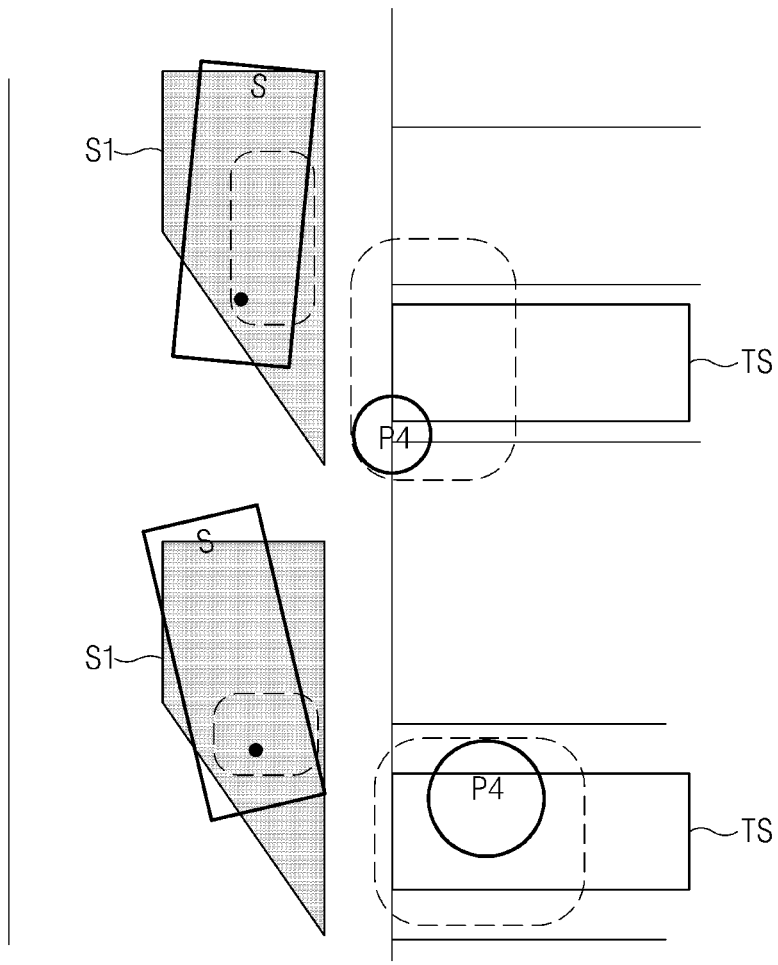
FIGS. 9 and 10 are views illustrating an example of setting a target parking position.
Figure 10:
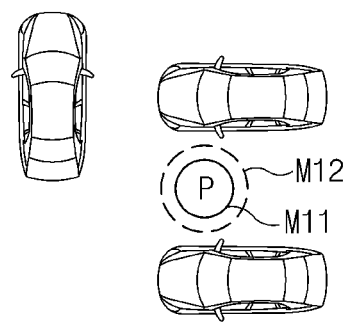

FIGS. 9 and 10 are views illustrating an example of setting a target parking position.

Referring to FIG. 9, the parking guidance apparatus may easily set a target parking position even in a state in which a vehicle is not aligned with a parking slot. Since the parking guidance apparatus supports parking guidance resistant to a heading angle of a vehicle on the basis of a point or an area, it can overcome difficulty of alignment of the related art line-based guidance apparatus.

As illustrated in FIG. 10, a marker includes a circle M11 having a width of a vehicle and a concentric circle M12 having a width of a parking slot such that a parking-available space may be determined, thereby coping with even in a case in which a parking slot line is absent. Meanwhile, the parking guidance apparatus may display a virtual parking slot line around a parking marker to help user determine whether parking is available.

When setting of a parking start position is completed using a parking position marker, a driver may move the vehicle to a position from which the vehicle may enter a parking slot, while adjusting a point marker to the boundary of the marker M11 or M12.

Figure 11:
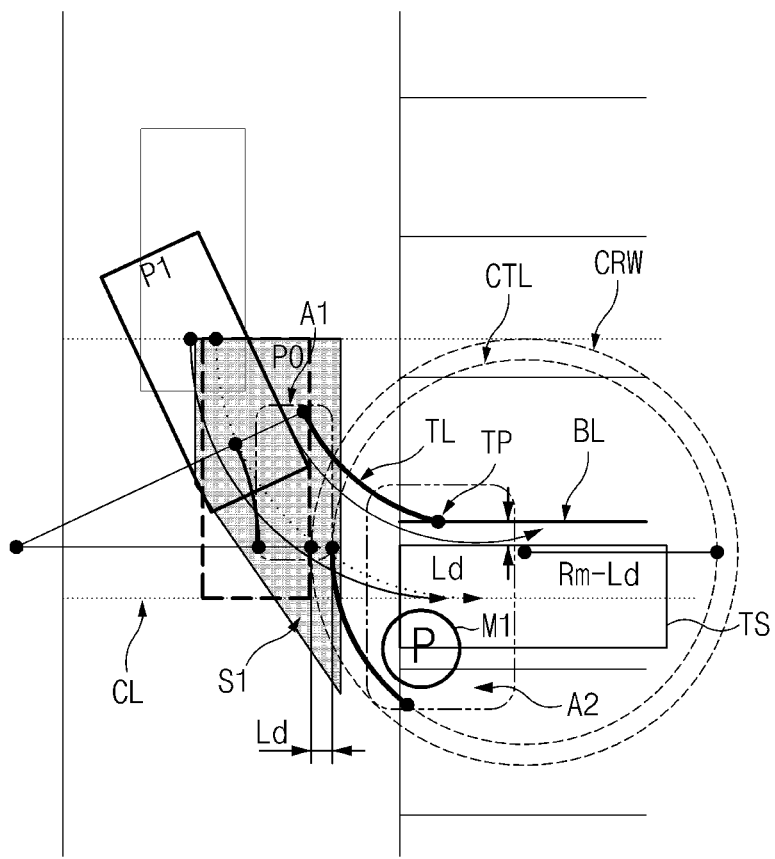
FIG. 11 is a view illustrating a principle of movement to a position from which a driver may enter a parking slot by using a point marker.

FIG. 11 is a view illustrating a principle of movement to a position from which a driver may enter a parking slot by using a point marker.

If an initial stop position setting area A1 and a corresponding parking position marker allowed area A2 are set within a parking-available area S1 as illustrated in FIG. 11, when the vehicle is positioned at the position of P0 for parking, the vehicle may be parked because the parking position marker is positioned within the area A2. In FIG. 11, since the area A2 is set to be larger than a parking slot, even though the user cannot accurately position the marker within the parking slot, parking guidance may be provided.

When the vehicle is moved to a position P1 at full turn steering, the vehicle may enter a target parking slot at full turn steering from the position P1. Here, when the vehicle is moved from the parking start position P0 to an initial movement position P1 not at full turn steering, the vehicle may enter the target parking slot at full turn steering. Also, even though a steering angle varies when the vehicle is moved from the parking start position P0 to the initial movement position P1, the vehicle may enter the target parking slot at full turn steering from the initial movement position.

When a point marker proposed is moved from the position P0 to the position P1, it may be used to determine whether the vehicle has reached the position P1. For example, when the point marker TP is positioned at the parking slot line BL in which the vehicle is to be parked, the parking guidance apparatus recognizes that the vehicle has reached the position P1 as illustrated in FIG. 11.

A position of the point marker is set as follows.

(1) The point marker TP is set at a position corresponding to a maximum distance between the vehicle and the parking slot in a case in which the center of the rear axle is within the initial stop position setting area A1 in a state in which the vehicle is positioned to be aligned with the parking slot.

(2) When the vehicle enters a parking slot with a centric circle having a minimum turning radius trace CRW of a rear wheel of a rear axle and the vehicle is positioned at the center of the parking slot, a concentric circle CTL obtained by subtracting a distance from a minimum turning radius at a point given an offset by a distance Ld between the vehicle and a parking slot line is drawn. Here, the offset Ld may not be a value for the vehicle to be positioned at the center of the parking slot.

(3) A point of intersection between the concentric circle CRL and an entry line of the parking slot is set as a position of a point marker. A shape of the point marker is not limited to a circular shape and may be implemented to have various shapes such as a quadrangular or triangular shape.

Figure 12A:
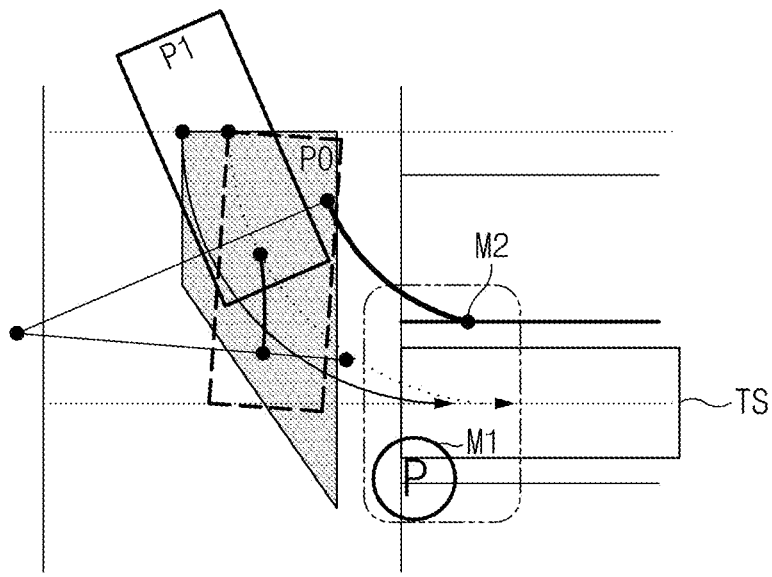
FIGS. 12A and 12B are views illustrating a steering margin in parking a vehicle using a point marker.
Figure 12B:
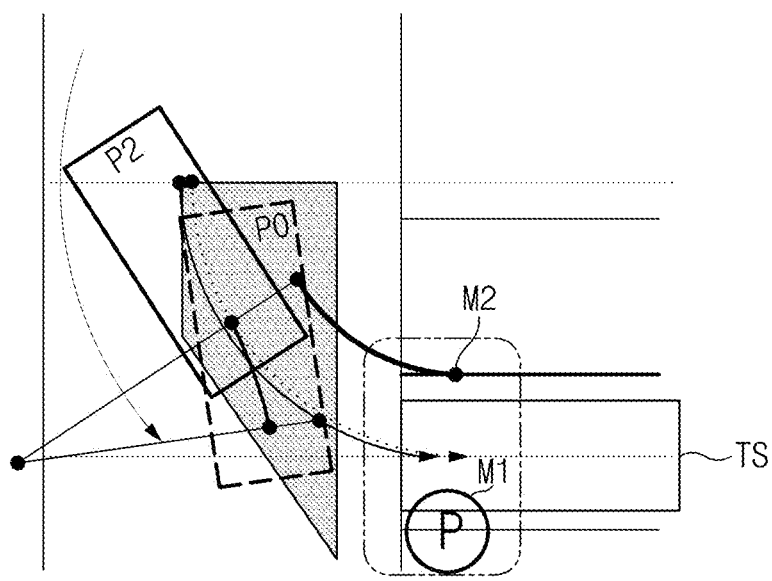

FIGS. 12A and 12B are views illustrating a steering margin in parking a vehicle using a point marker.

As illustrated in FIGS. 12A and 12B, when a reference trace for a vehicle to move back and enter a parking slot is determined to be greater than the minimum turning radius and a point marker is displayed, a steering margin that may be operated by a driver may be provided over the minimum turning radius. That is, even though the driver cannot accurately adjust the point marker by the steering margin, the driver may drive the vehicle to back and enter the parking slot.

Figure 13:
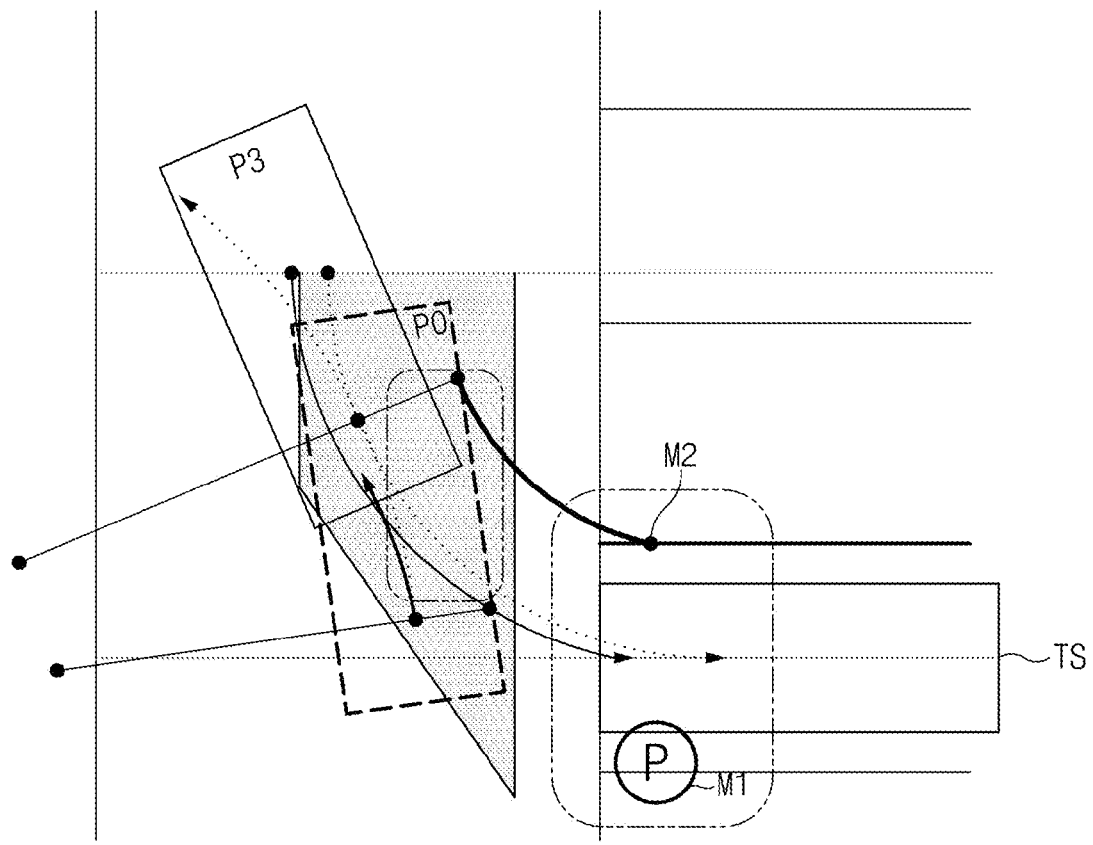
FIG. 13 is a view illustrating parking using a point marker.

FIG. 13 is a view illustrating parking using a point marker.

Referring to FIG. 13, after a target parking slot (target parking position) is set, even though the driver does not turn the steering gear full turn to move from a parking start position to an initial movement position, the driver may enter the target parking slot at full turn steering from the initial movement position.

Figure 14A:
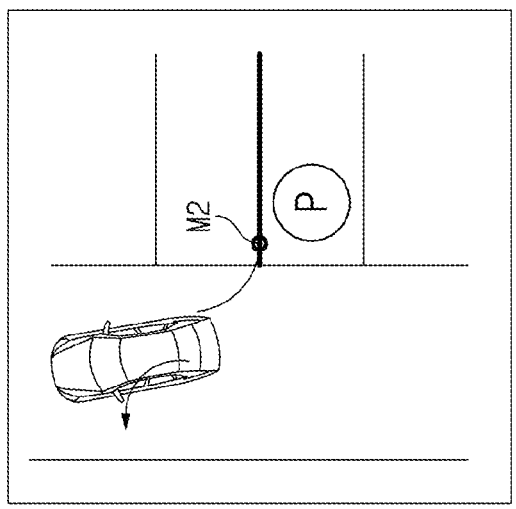
FIGS. 14A to 14C are views illustrating an example of displaying an additional marker for intuitional recognition of a reference line to which a point marker is to be adjusted.
Figure 14B:
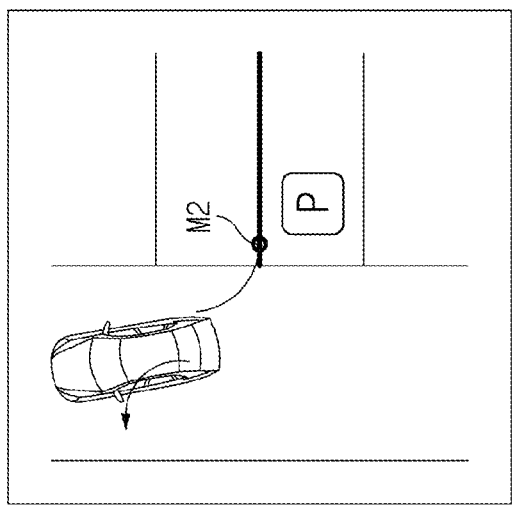
Figure 14C:
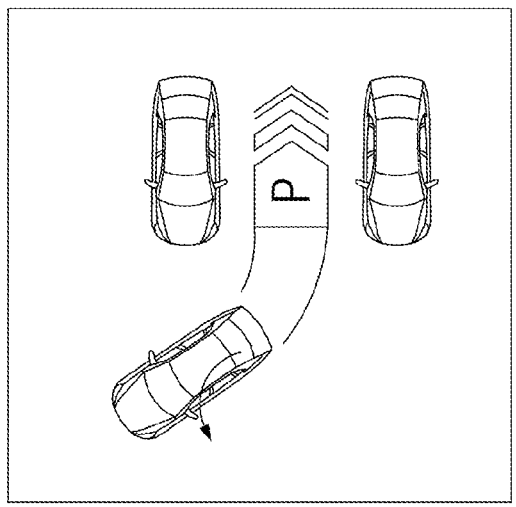

FIGS. 14A to 14C are views illustrating an example of displaying an additional marker for intuitional recognition of a reference line to which a point marker is to be adjusted.

As illustrated in FIGS. 14A to 14C, the parking guidance apparatus displays a parking position marker as an additional marker, in addition to a point marker. The parking guidance apparatus may display a point marker and an additional marker in various other figures and designs.

Figure 15:
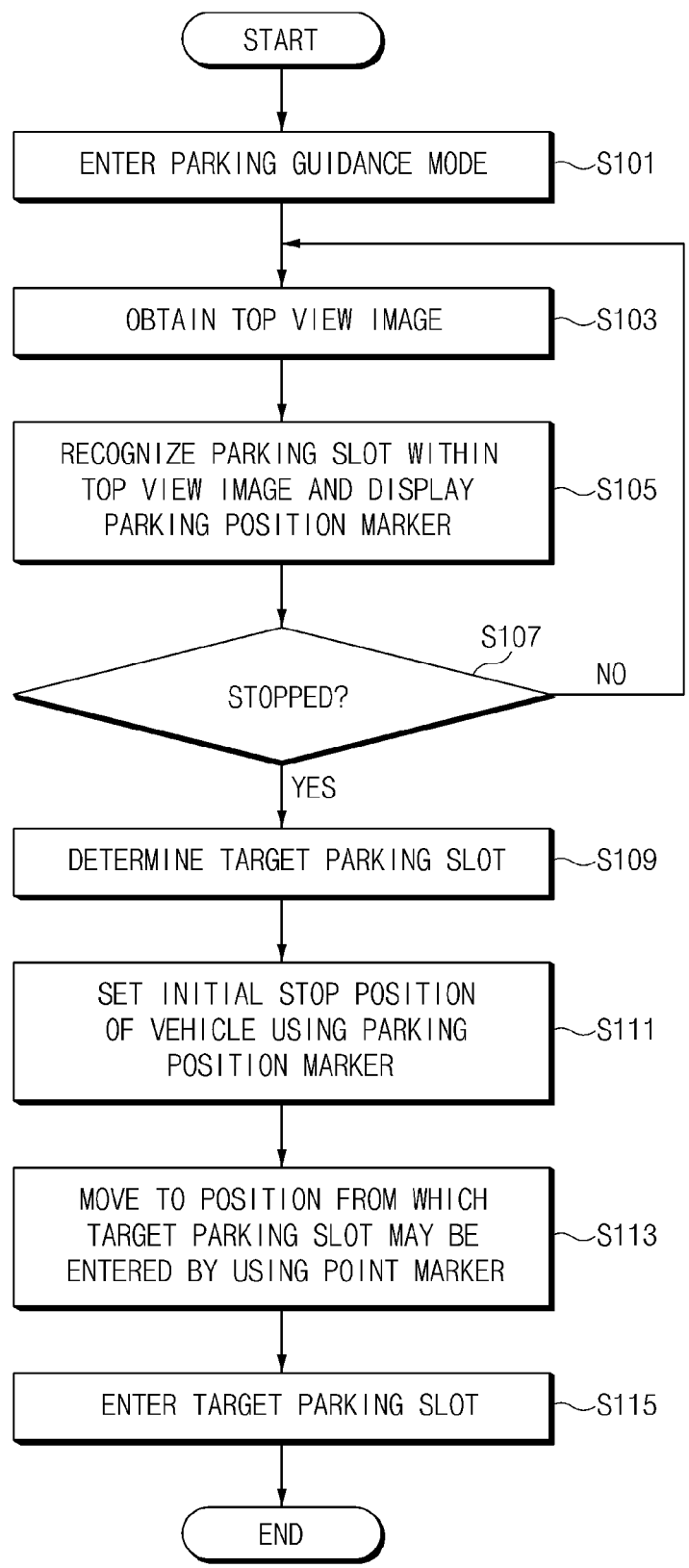
FIG. 15 is a flow chart illustrating a parking guidance method.

FIG. 15 is a flow chart illustrating a parking guidance method.

As illustrated in FIG. 15, the parking guidance apparatus enters a parking guidance mode according to a user input in operation S101. Here, a user selects a parking support function and a parking type.

When the parking guidance apparatus enters the parking guidance mode, the parking guidance apparatus obtains an omni-directional image around a vehicle in operation S103. When the parking guidance mode is entered, the image processor 120 converts images around the vehicle obtained through the image obtainer 110 into top view images under the control of the controller 170.

The controller 170 of the parking guidance apparatus recognizes a parking-available area within the top view images and displays a parking position marker near the own vehicle in operation S105.

While displaying the parking position marker, the controller 170 determines whether the vehicle is stopped in operation S107.

When the vehicle is stopped, the controller 170 determines a region where the parking position marker is positioned in the parking-available area, as a target parking slot in operation S109.

The controller 170 sets a parking start position of the vehicle by using the parking position marker in operation S111.

The controller 170 moves to a position from which the vehicle may enter the target parking slot, by using a point marker in operation S113. The controller 170 sets an initial display position of the point marker at the initial stop position. As the vehicle moves, the controller 170 determines whether the point marker and a reference line overlap each other. When the point marker and the reference line meet, the controller 170 recognizes that the vehicle has reached the initial movement position.

When the vehicle reaches the initial movement position, the controller 170 provides parking guidance such that the vehicle enters the target parking slot in operation S115.

Figure 16:
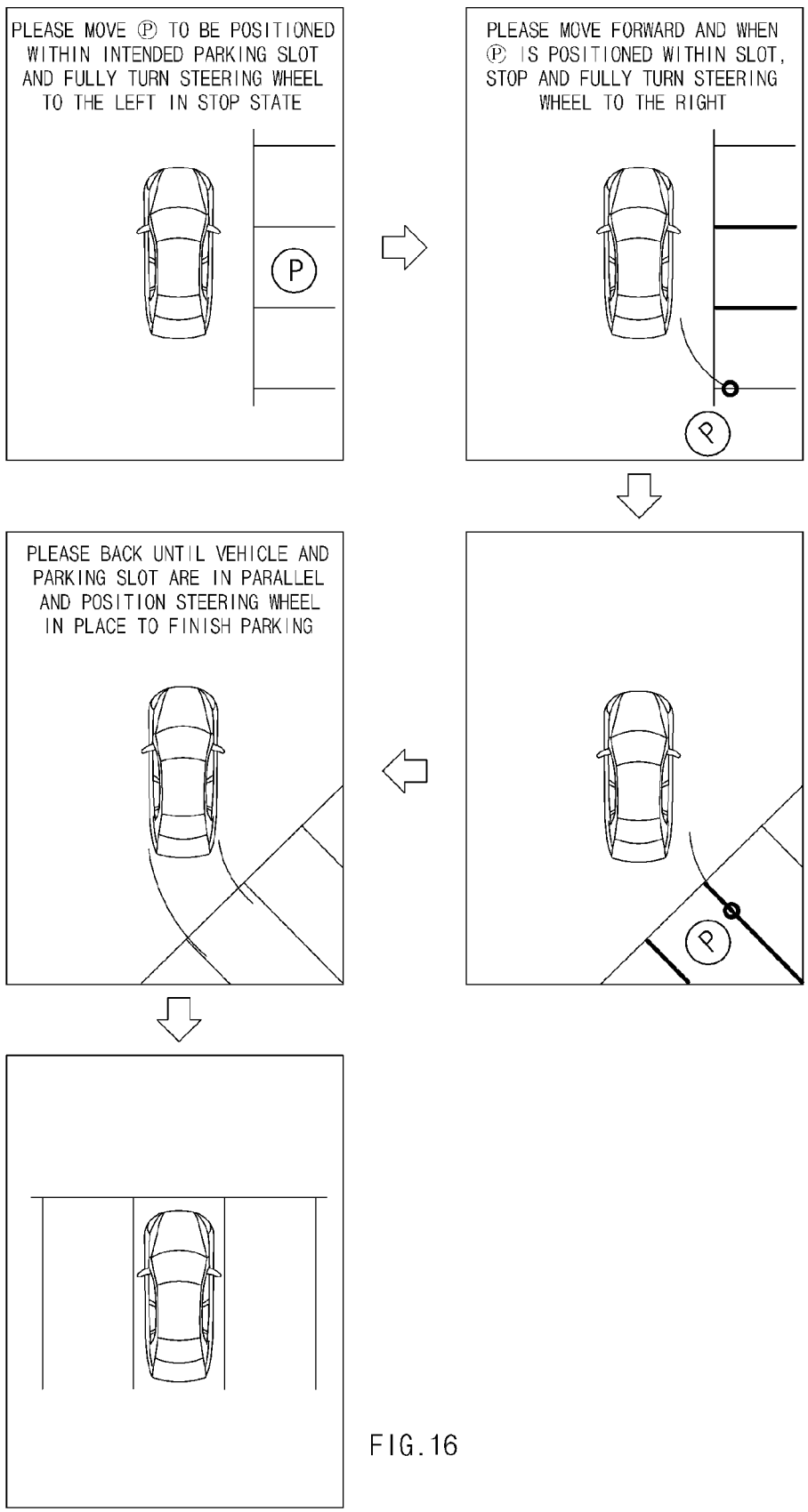
FIG. 16 is a view illustrating guidance screens by parking guidance stages.

FIG. 16 is a view illustrating guidance screens by parking guidance stages according to another exemplary form of the present disclosure.

When the vehicle enters a parking guidance mode, the parking guidance apparatus outputs parking guidance information such as "Please move ⓟ to be positioned within an intended parking slot and fully turn the steering wheel to the left in stop state." The driver moves the vehicle according to the guidance of the parking guidance apparatus to make the parking position marker ⓟ be positioned within the target parking slot and fully turns the steering wheel to the left in the stop state.

When the stop state of the vehicle and full turn steering are detected, the parking guidance apparatus outputs next guidance information "Please move forward and when ⓟ is positioned within the slot, stop and fully turn the steering wheel to the right." Here, the parking guidance apparatus tracks a display position of the parking position marker ⓟ through odometry. Alternatively, the parking guidance apparatus may display the parking position marker ⓟ on a central line of the parking slot recognized through parking slot line recognition, in real time.

When the parking position marker ⓟ is positioned within the target parking slot as the vehicle moves forward, the parking guidance apparatus determines whether the vehicle is stopped and the steering wheel is fully turned to the right. When the driver shifts into the reverse gear and fully turns the steering wheel to the right in a state in which the vehicle is stopped, the parking guidance apparatus outputs next parking guidance information "Please back until the vehicle and the parking slot are in parallel and position the steering wheel in place to finish parking." The driver controls the vehicle according to the parking guidance information and parks the vehicle within the target parking slot. When a parking gear is recognized, the parking guidance apparatus terminates parking guidance.

In the aforementioned exemplary forms, the reverse perpendicular parking is described as an example to help understand the explanation, but parking guidance may also be provided even for front end perpendicular parking, slanted parking, and parallel parking. When the front end perpendicular parking, slanted front end parking, slanted rear end parking is intended, when a vehicle turns, the vehicle may maintain a distance to a parking slot line to avoid collision between an end of a bumper and an adjacent vehicle and only a point marker may be adjusted to a parking slot line, thus the vehicle may be parked.

As described above, since an area-based parking guidance marker is used in guiding an AVM image-based parking, parking may be guided for various types of parking.

In addition, when a vehicle enters, limitations in a distance between a parking slot and the vehicle and an entry angle may be reduced.

Moreover, a target parking position may be easily set by simply positioning a parking position marker in a marker display available area within a target parking slot.

Furthermore, since a parking start position may be set by using an area-based parking position marker and an initial movement position is set by using a point marker, a large tolerance range is provided for driver's operation.

Since a parking start position error is compensated on the basis of a turning amount of a vehicle, a driver may easily operate a parking start position marker.

In addition, when a vehicle moves from a parking start position to an initial movement position, the vehicle turns at full turn steering, facilitating a driver's operation, and even when there is a change in steering while on the move, the vehicle may be parked by adjusting a point marker to a reference parking slot line. In this manner, since the vehicle is stopped on the basis of a point marker (an auxiliary marker shape when a parking slot line is not provided), adjustment is facilitated.

Additionally, controlling of basic operations of a vehicle according to parking types is simplified to two steps and one-step parking guidance may be provided for 45-degree slanted parking and stepwise front end parking.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A parking guidance apparatus comprising:
   an image obtainer configured to capture an image around a vehicle;
   an image processor configured to generate an around view monitoring (AVM) image using images captured by the image obtainer; and
   a controller configured to:
      determine, when entering a parking guidance mode, a display position of a parking position marker near the vehicle within the AVM image,
      determine a target parking slot in which the parking position marker is positioned,
      determine a display position of a point marker for setting an initial movement position from which the vehicle enters the target parking slot,
      guide movement of the vehicle to the initial movement position using the point marker, and
      guide the vehicle to enter the target parking slot when the vehicle reaches the initial movement position.

2. The parking guidance apparatus according to claim 1, wherein the image obtainer comprises at least one of a plurality of cameras, an omni-view camera, or an AVM camera.

3. The parking guidance apparatus according to claim 1, wherein when an area equal to or greater than a predetermined area of the parking position marker overlaps a parking-available area, the controller is configured to determine the corresponding parking-available area as the target parking slot.

4. The parking guidance apparatus according to claim 1, wherein the controller is configured to determine a display position of the parking position marker according to a central position of a rear axle at a parking start position in relation to a central axis of a parking slot.

5. The parking guidance apparatus according to claim 4, wherein the controller is configured to determine the display position of the parking position marker according to an available road width and a presence or absence of an obstacle.

6. The parking guidance apparatus according to claim 1, wherein, in a state in which the vehicle is positioned to be parallel to a parking slot, when a center of a rear axle is positioned within a parking start position set area, the controller is configured to set a display position of the point marker based on a position corresponding to a maximum distance between the center of the rear axle and the parking slot.

7. The parking guidance apparatus according to claim 6, wherein the parking start position set area is an area in which the center of the rear axle of the vehicle is positioned to park the vehicle to the target parking slot without contacting vehicles parked in a parking slot adjacent to the target parking slot when the target parking slot is set.

8. The parking guidance apparatus according to claim 1, wherein when the vehicle enters a parking slot with a centric circle having a minimum turning radius trace of a rear wheel of a rear axle and the vehicle is positioned at a center of the parking slot, the controller is configured to form a concentric circle obtained by subtracting a distance from a minimum turning radius at a point given an offset by a distance between the vehicle and a parking slot line, and configured to determine the display position of the point marker at a point of intersection between the concentric circle and a parking slot entry line.

9. The parking guidance apparatus according to claim 1, wherein when the point marker is positioned on a target parking slot line, the controller is configured to recognize that the vehicle has reached the initial movement position.

10. The parking guidance apparatus according to claim 1, wherein when vehicle data obtained through a sensor installed in the vehicle meet transition conditions, the controller is configured to automatically change a parking guidance stage.

11. A parking guidance method comprising:
determining, by a controller, a display position of a parking position marker near a vehicle within an around view monitoring (AVM) image when a parking guidance mode is entered;
determining, by the controller, a parking-available area within the AVM image as a target parking slot in which the parking position marker is positioned;
determining, by the controller, a display position of a point marker for setting an initial movement position from which the vehicle enters the target parking slot, after the target parking slot is determined;
guiding, by the controller, movement of the vehicle to the initial movement position by using the point marker; and
when the vehicle reaches the initial movement position, guiding entry of the vehicle to the target parking slot.

12. The method according to claim 11, wherein, in the determining of the target parking slot, when an area equal to or greater than a predetermined area of the parking position marker overlaps the parking-available area, the corresponding parking-available area is determined as the target parking slot.

13. The method according to claim 11, wherein, in the determining the display position of the parking position marker, the display position of the parking position marker is determined according to a central position of a rear axle at a parking start position in relation to a central axis of a parking slot.

14. The method according to claim 13, wherein, in the determining the display position of the parking position marker, the display position of the parking position marker is determined according to an available road width and a presence or absence of an obstacle.

15. The method according to claim 11, wherein, in the determining the display position of the point marker, in a state in which the vehicle is positioned to be parallel to a parking slot,
a position corresponding to a maximum distance between a center of a rear axle of the vehicle and a parking slot within a parking start position set area is set as a display position of the point marker.

16. The method according to claim 11, wherein, in the determining the display position of the point marker,
when the vehicle enters a parking slot with a centric circle having a minimum turning radius trace of a rear wheel of a rear axle and the vehicle is positioned at a center of the parking slot, a concentric circle obtained by subtracting a distance from a minimum turning radius at a point given an offset by a distance between the vehicle and a parking slot line is formed, and the display position of the point marker is determined at a point of intersection between the concentric circle and a parking slot main direction line.

17. The method according to claim 11, wherein, in the guiding of movement of the vehicle to the initial movement position, when the point marker is positioned on a target parking slot line, the vehicle's reaching to the initial movement position is recognized.

\* \* \* \* \*